(12) United States Patent
Schatzberg et al.

(10) Patent No.: US 9,414,630 B2
(45) Date of Patent: Aug. 16, 2016

(54) GLOVE WITH EXPANSION AREAS THAT FIT OVER RINGS

(71) Applicants: Ilana Wolf Schatzberg, New York, NY (US); Annie Schatzberg, New York, NY (US)

(72) Inventors: Ilana Wolf Schatzberg, New York, NY (US); Annie Schatzberg, New York, NY (US)

( * ) Notice: Subject to any disclaimer, the term of this patent is extended or adjusted under 35 U.S.C. 154(b) by 0 days.

(21) Appl. No.: 14/581,791

(22) Filed: Dec. 23, 2014

(65) Prior Publication Data

US 2016/0174634 A1 Jun. 23, 2016

Related U.S. Application Data

(60) Provisional application No. 62/093,158, filed on Dec. 17, 2014.

(51) Int. Cl.
*A41D 19/00* (2006.01)
*A41D 19/04* (2006.01)
*A41D 19/015* (2006.01)

(52) U.S. Cl.
CPC .......... *A41D 19/0082* (2013.01); *A41D 19/015* (2013.01); *A41D 19/04* (2013.01); *A41D 19/00* (2013.01)

(58) Field of Classification Search
CPC . A41D 19/00; A41D 19/01547; A61B 19/04; A63B 71/146
USPC ............ 2/163, 161.7, 161.8, 167, 168, 161.3, 2/159
See application file for complete search history.

(56) References Cited

U.S. PATENT DOCUMENTS

| | | | | | |
|---|---|---|---|---|---|
| 2,036,413 | A | * | 4/1936 | Herbruck | 2/168 |
| 3,283,338 | A | * | 11/1966 | Landau | 2/161.6 |
| 3,662,054 | A | * | 5/1972 | Wollmann et al. | 264/300 |
| 3,867,727 | A | * | 2/1975 | Povlacs | 2/167 |
| 4,441,213 | A | * | 4/1984 | Trumble et al. | 2/16 |
| 5,323,490 | A | * | 6/1994 | Yarbrough | 2/161.7 |
| 5,953,751 | A | * | 9/1999 | Kobren | 2/16 |
| 6,415,443 | B1 | * | 7/2002 | Schierenbeck et al. | 2/159 |

\* cited by examiner

*Primary Examiner* — Tejash Patel
(74) *Attorney, Agent, or Firm* — Simpson & Simpson, PLLC

(57) ABSTRACT

The present invention comprises an expandable glove including a glove body having a palmar side and a backhand side; a plurality of finger portions and a thumb portion each having a palmar side and a backhand side, wherein the finger portions and thumb portion are operatively attached to said glove body; and, an expandable area smocked into at least one of the finger portions on the backhand side. Also included is a glove produced by the method of dipping a hand mold in liquid latex, the hand mold having a finger with a concavity; drying the liquid latex into dried latex; and, turning the dried latex inside-out to remove the dried latex from the hand mold.

7 Claims, 7 Drawing Sheets

GLOVE WITH EXPANSION AREAS THAT FIT OVER RINGS

CROSS-REFERENCE TO RELATED APPLICATIONS

This application claims the benefit of U.S. Provisional Application No. 62/093,158, filed on Dec. 17, 2014, which application is incorporated herein by reference in its entirety.

FIELD OF THE INVENTION

The present invention relates generally to gloves, and, more specifically, to gloves with expansion areas to accommodate rings.

BACKGROUND OF INVENTION

Typically, gloves do not allow the wearer to keep rings on. Taking off rings temporarily is something most people would prefer not to do because taking off a ring increases the likelihood of losing it or having it stolen.

SUMMARY OF INVENTION

The present invention comprises an expandable glove including a glove body having a palmar side and a backhand side; a plurality of finger portions and a thumb portion each having a palmar side and a backhand side, wherein the finger portions and thumb portion are operatively attached to said glove body; and, an expandable area smocked into at least one of the finger portions on the backhand side.

The present invention also comprises a glove produced by the following method: operatively attaching a plurality of finger portions and a thumb portion to a glove body, the glove body, the thumb portion, and the finger portions having a palmar side and a backhand side; and, smocking at least one expandable area into at least one of the finger portions or the thumb portion on the backhand side.

The present invention further comprises a glove produced by the method of dipping a hand mold in liquid latex, the hand mold having a finger with a concavity, drying the liquid latex into dried latex, and, turning the dried latex inside-out to remove the dried latex from the hand mold.

A first object of the invention is to provide a glove having expandable areas to fit over rings.

A second object of this invention is to provide an option for the wearer to leave rings on.

A third object of this invention is to provide an aesthetically pleasing means of wearing a glove.

A fourth object of this invention is to provide color and stylistic variations of the glove with expansion areas that fit over rings.

These objects are achieved by the design of ring expansion areas on the top part of the glove. When the wearer of the glove inserts their hand while keeping their rings on, on any finger on both hands including or not including both thumbs, the rings fit comfortably in the glove. This provides the wearer greater security from losing, misplacing or having their rings stolen. The ring expansion areas each have a general dimension of ½" in width and 1" in length. The material forming this expansion area can be, but is not limited to, the same material as the glove, such as leather and synthetic fabrics with or without stretch. The ring expansion area is approximately ½" above the finger crotch and ½" below the finger crotch for all fingers including or not including the thumb. In particular, each expansion area is preferably positioned between the metacarpophalangeal joint and the proximal interphalangeal joint of a user's hand. The areas can be made to expand using various techniques including a custom mold that causes the material to billow out. For instance, dishwashing gloves are made out of latex in a liquid state. A hand mold is used to form its' shape and this hand mold can be adapted so the latex glove form pockets on all fingers where rings are worn. Another way of achieving these expansion areas is by elastic smocking, which is an embroidery technique that stitches elastic to the material in a horizontal and or vertical manner which causes the material to both shrink and expand.

The glove with expansion areas to fit over rings goes on easily and expands on any finger a ring is worn. In most cases, gloves do not allow the wearer to keep rings on. Taking off rings temporarily is something most people would prefer not to do. The glove is aesthetically pleasing and can be coordinated to match an outfit. The wearer's hand fits easily into the glove and can be easily taken out. By having an expandable glove that fits over rings makes valuables safe from loss or theft.

BRIEF DESCRIPTION OF THE DRAWINGS

The nature and mode of operation of the present invention will now be more fully described in the following detailed description of the invention taken with the accompanying drawing figures, in which:

FIG. 7 is a perspective view of the invention showing the wearer with or without rings on.

DETAILED DESCRIPTION OF THE INVENTION

The present invention provides a glove with expansion areas to fit over rings of most sizes on all fingers including or not including the thumb. These expansion areas are configured in a novel manner and keeps its' shape while in use or not in use. While the present invention is described with respect to what is presently considered to the preferred embodiments, it is understood that the invention is not limited to the disclosed embodiments.

Furthermore, it is understood that this invention is not limited to the particular methodology, materials and modifications described and such made, of course vary. It is also understood that the terminology used herein is for the purpose of describing particular embodiments only, and is not intended to limit the scope of the present invention, which is limited only by the appended claims.

Although any methods, devices or materials similar or equivalent to those described herein can be used in the practice of testing the invention, the preferred methods, devices and materials are now described.

The present invention broadly comprises a glove with expansion in specific areas. This expansion holds its' shape at all times.

Figure 1:
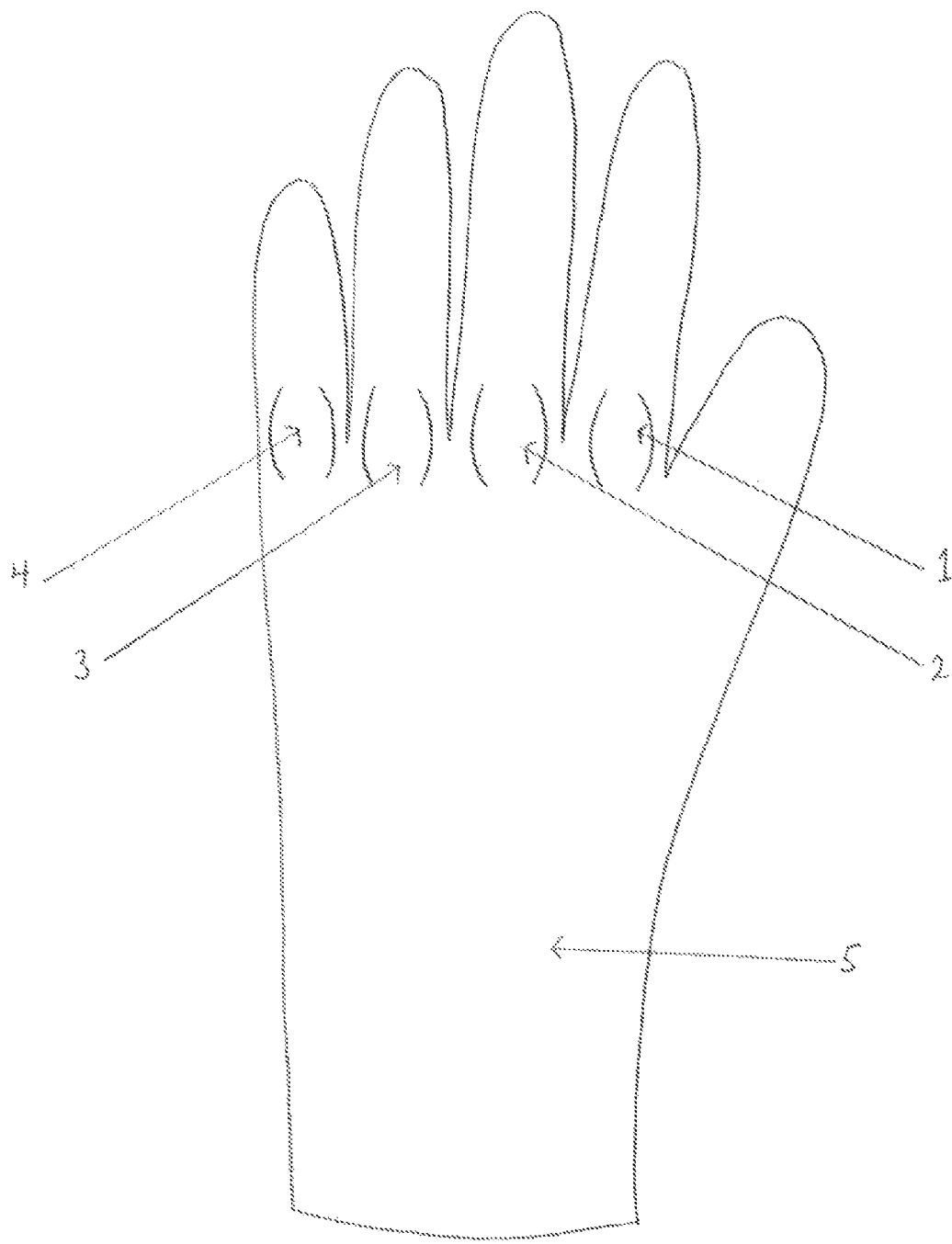
FIG. 1 is a front view of the present invention showing all expansion areas and the glove in the same material.

Referring to FIG. 1, there is shown a front view of the glove in the preferred embodiment, showing the expansion area on the first finger 1 the middle finger 2 the third or ring finger 3 and the baby finger 4 with the material 5 being of the same matter for all of the glove.

Figure 2:
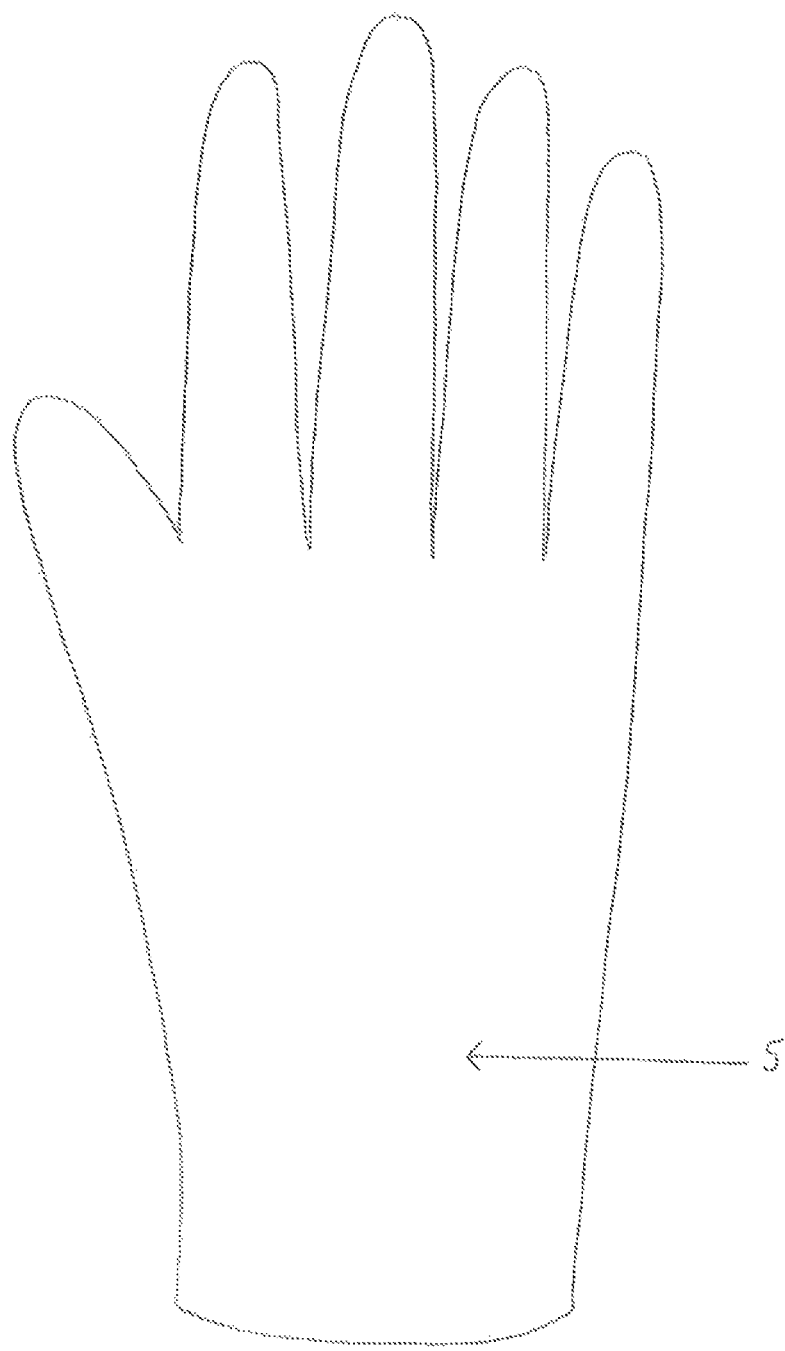
FIG. 2 is a rear view of the present invention showing the same material as the top of the glove.

Referring next to FIG. 2, there is shown a rear view of the glove in the preferred embodiment showing the underside, or palm, of the glove which is the same material 5 as the top side.

Figure 3:
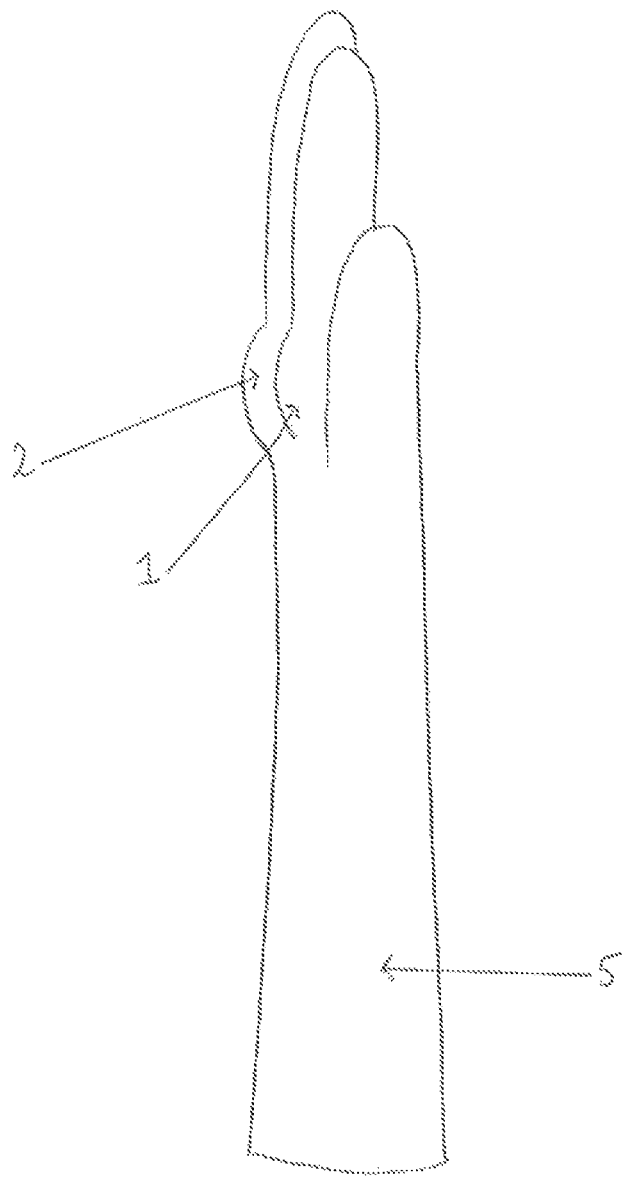
FIG. 3 is a lateral elevated view of the right side of the invention showing the thumb, first finger and middle fingers.

Referring next to FIG. 3, there is shown a lateral elevated view of the right side of the preferred embodiment with the expansion area on the first finger 1 the expansion area on the middle finger 2 and the material 5 being of the same matter for the glove for the glove and expansion areas.

Figure 4:
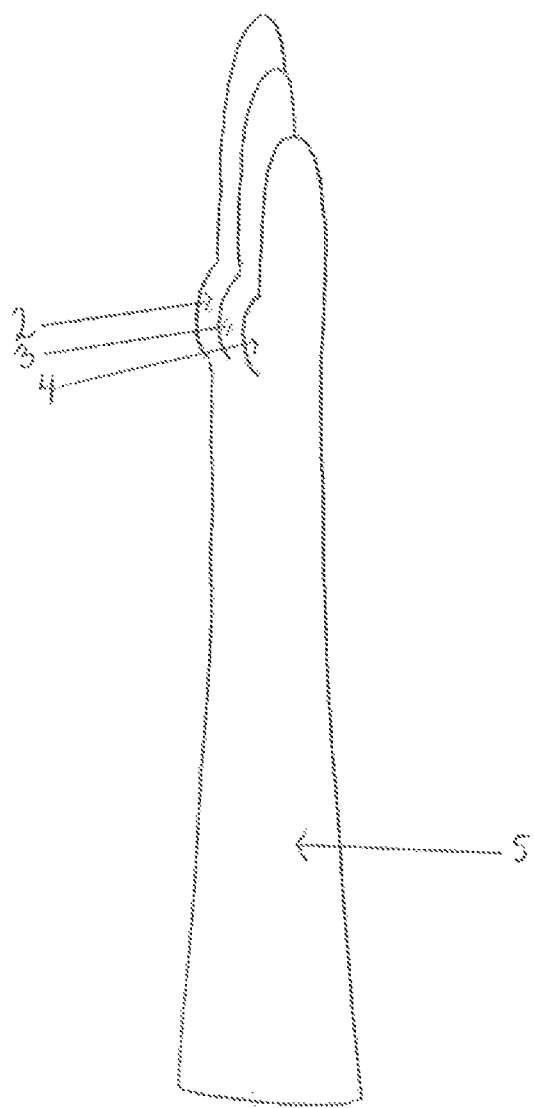
FIG. 4 is a lateral elevated view of the left side of the invention showing the baby finger, third or ring finger and the middle finger.

Referring next to FIG. 4, there is shown a lateral elevated view of the left side of the preferred embodiment with the expansion area on the baby finger 4 the third or ring finger 3 and the middle finger 2 and the material 5 being of the same matter for the glove and expansion areas.

Figure 5:
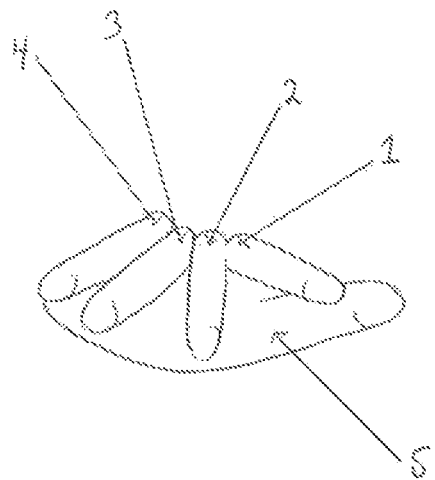
FIG. 5 is a top rear view of the invention showing the ring pockets on all fingers.

Referring next to FIG. 5, there is shown a top rear view of the preferred embodiment with the expansion area on the first finger 1 the middle finger 2 the third or ring finger 3 and the baby finger 4 with the material 5 being of the same matter for the glove and expansion areas.

Figure 6:
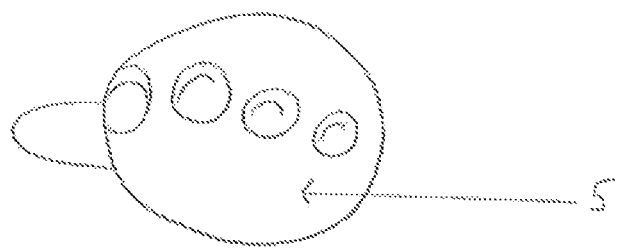
FIG. 6 is a bottom rear view of the invention.

Referring next to FIG. 6 there is shown a bottom rear view of the preferred embodiment showing the material 5 of the glove.

Figure 7:
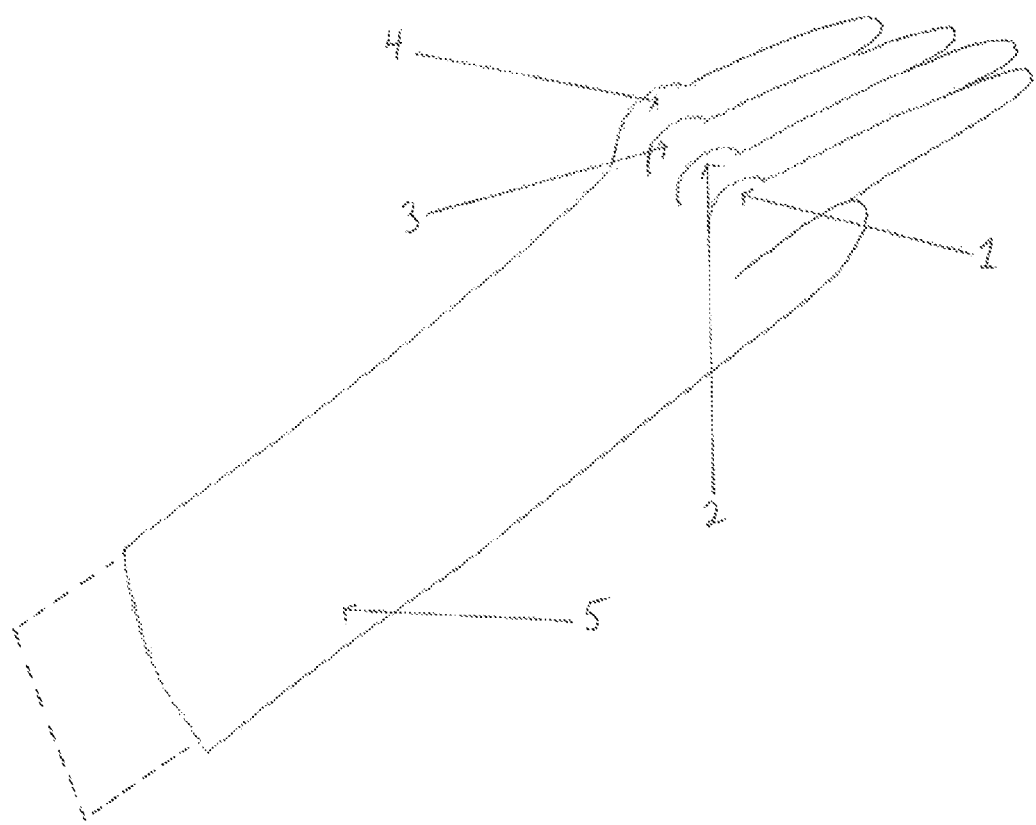

Referring next to FIG. 7, there is shown an overall perspective view showing the glove with expansion areas on the hand with the expansion areas on the first finger 1 middle finger 2 third or ring finger 3 and baby finger 4 all in a billowing out formation regardless of an object inside causing them to expand with the material 5 being of the same matter for the glove and expansion areas.

The glove is produced by dipping a hand mold into liquid latex, drying the liquid latex into dried latex and then peeling the dried latex off the hand mold, which turns the shape of the dried latex inside-out. The hand mold has at least one finger with a concavity configured at a position to accommodate a ring. The hand mold has a concavity instead of a protruding bulge because the dried latex gets turned inside out when being peeled off the hand mold, thereby creating an area in the glove to accommodate a ring being worn by a wearer.

Obviously, many modifications and variations on the novel features of this invention are possible and it will be understood that the various omissions, substitutions and changes in the forms and details of the advice illustrated and its operations, can be made by those having ordinary skill in the art, without departing from the spirit of the invention.

What I claim is:

1. An expandable glove, comprising:
    a glove body having a palmar side and a backhand side;
    a plurality of finger portions and a thumb portion each having a palmar side and a backhand side, wherein the finger portions and thumb portion are operatively attached to said glove body; and,
    at least one expandable area extending outwardly from at least two finger portions on the backhand side, wherein when the glove is in use, the at least one expandable area is positioned between the metacarpophalangeal joint and the proximal interphalangeal joint of a user's hand.

2. The glove of claim 1, wherein a plurality of expandable areas are smocked into the at least two finger portions on the backhand side.

3. The glove of claim 1, wherein a second expandable area is smocked into the thumb portion on the backhand side.

4. A single ply glove produced by the following method:
    dipping a hand mold in liquid latex, the hand mold having at least two finger portions with at least one concavity, wherein the at least one concavity forms at least one expandable area such that when the glove is in use, the at least one expandable area is positioned between the metacarpophalangeal joint and the proximal interphalangeal joint of a user's hand;
    drying the liquid latex into dried latex; and,
    turning the dried latex inside-out to remove the dried latex from the hand mold.

5. A method of using an expandable glove, where the glove includes a glove body, a plurality of finger portions and a thumb portion attached to the glove body, and at least one expandable area extending outwardly from at least two finger portions, the method comprising the following steps:
    sliding the glove body over a hand of a user, the hand including at least one finger and a ring disposed about the at least one finger;
    sliding each finger portion and thumb portion of the glove over the corresponding finger, wherein the at least one expandable area covers the at least one ring and the at least one expandable area is positioned between the metacarpophalangeal joint and the proximal interphalangeal joint of a user's hand.

6. The glove of claim 1, wherein a plurality of expandable areas are molded into the at least two finger portions on the backhand side.

7. The glove of claim 1, wherein a second expandable area is molded into the thumb portion on the backhand side.

\* \* \* \* \*